United States Patent
Griffin et al.

(10) Patent No.: US 10,592,855 B2
(45) Date of Patent: Mar. 17, 2020

(54) METHOD, SYSTEM, AND COMPUTER PROGRAM PRODUCT FOR PLANOGRAM GENERATION

(71) Applicants: Michael Griffin, Redwood City, CA (US); Jonathan Zaremski, San Mateo, CA (US); Jamey Graham, Menlo Park, CA (US); Tiffany Romain, Oakland, CA (US); Roland Findlay, San Jose, CA (US)

(72) Inventors: Michael Griffin, Redwood City, CA (US); Jonathan Zaremski, San Mateo, CA (US); Jamey Graham, Menlo Park, CA (US); Tiffany Romain, Oakland, CA (US); Roland Findlay, San Jose, CA (US)

(73) Assignee: Ricoh Co., Ltd., Tokyo (JP)

( * ) Notice: Subject to any disclaimer, the term of this patent is extended or adjusted under 35 U.S.C. 154(b) by 801 days.

(21) Appl. No.: 15/164,825

(22) Filed: May 25, 2016

(65) Prior Publication Data

US 2017/0178061 A1    Jun. 22, 2017

Related U.S. Application Data

(60) Provisional application No. 62/269,898, filed on Dec. 18, 2015.

(51) Int. Cl.
*G06Q 30/00* (2012.01)
*G06Q 10/08* (2012.01)
(Continued)

(52) U.S. Cl.
CPC ....... *G06Q 10/087* (2013.01); *G06K 9/00771* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 2008/0147475 A1* | 6/2008 | Gruttadauria | G06Q 10/087 705/7.31 |
| 2011/0011936 A1* | 1/2011 | Morandi | G06K 9/00 235/454 |

(Continued)

OTHER PUBLICATIONS

Nant holdings ip, llc; patent application titled "virtual planogram management systems and methods" published online. (Mar. 18, 2015). Electronics Newsweekly Retrieved from http://dialog.proquest.com/professional/docview/1662011940?accountid=161862 (Year: 2015).*

(Continued)

*Primary Examiner* — Marissa Thein
*Assistant Examiner* — Ashley D Preston
(74) *Attorney, Agent, or Firm* — Patent Law Works LLP

(57) ABSTRACT

A system and method that generates a planogram is disclosed. The method includes receiving, from an image processing module, a realogram, the realogram including information about items recognized in an image, aligning the items in the realogram using the information about the items recognized in the image, relocating the items horizontally and vertically such that the items are distributed among a plurality of aligned, non-overlapping slots, and providing the relocated items for display as a planogram of the items.

19 Claims, 15 Drawing Sheets

(51) Int. Cl.
*G06Q 30/06* (2012.01)
*G06K 9/00* (2006.01)

(56) References Cited

U.S. PATENT DOCUMENTS

| 2015/0049080 A1* | 2/2015 | Purayil | H04L 67/2847 |
| | | | 345/419 |
| 2015/0324725 A1* | 11/2015 | Roesbery | G06Q 30/0639 |
| | | | 705/7.39 |

OTHER PUBLICATIONS

"Patents; Researchers Submit Patent Application, "Virtual Planogram Management, Systems, and Methods"for Approval." Electronics Newsweekly May 28, 2014: 11500. 19 (Year: 2014).*

* cited by examiner

METHOD, SYSTEM, AND COMPUTER PROGRAM PRODUCT FOR PLANOGRAM GENERATION

CROSS REFERENCE TO RELATED APPLICATIONS

The present application claims priority, under 35 U.S.C. § 119, of U.S. Provisional Patent Application No. 62/269,898, filed Dec. 18, 2015 and entitled "Planogram Generation," which is incorporated by reference in its entirety.

BACKGROUND

Field of the Invention

The specification generally relates to generating a planogram for representing a structured positioning of items on a shelving unit. In particular, the specification relates to a system and method for generating a planogram based on identifying patterns relating to the positioning of items on shelving units in retail stores.

Description of the Background Art

A planogram is a data or visual representation of products in a retail environment. For example, a planogram may describe where in the retail environment and in what quantity products should be located. Such planograms are tools designed for increasing sales, managing inventory and otherwise ensuring that the desired quantity and sizes of an item are placed to optimize, for example, profits. However, such planograms may not easily be available or used in some retail situations. Some retail stores may present and maintain adequate levels of stock on shelves, racks and display stands without enforcing a planogram and be highly successful in moving more items than average without knowing why. While the location and quantity of products in the retail stores can be manually tracked by a user, attempts are being made to automatically recognize the products and automatically or semi-automatically obtain information about the state of products in order to generate an optimized planogram that can be put to use.

Previous attempts at generating planograms have deficiencies. For example, one method is to place cameras in stores and watch customer behavior to develop customer driven planograms. In another example, one method is to send representatives into retail stores to create planograms manually with pen and paper. Unfortunately, planograms developed through such methods can be time consuming, unreliable, and impact the sales performance negatively.

SUMMARY

The techniques introduced herein overcome the deficiencies and limitations of the prior art, at least in part, with a system and method for generating a planogram. In one embodiment, the system includes a planogram application. The planogram application is configured to receive information about items on a portion of a shelving unit (e.g., recognition results and/or a realogram). The information may include locations of products on the shelving unit. The planogram application is further configured to align the items across the shelf of the shelving unit. The planogram application is further configured to minimally move the items horizontally and inwards such that the items are spaced apart across the shelf of the shelving unit. The planogram application is further configured to identify a gap slot within a gap on the shelf of the shelving unit. The planogram application is further configured to provide a planogram of the items using the information about the products on the portion of the shelving unit.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
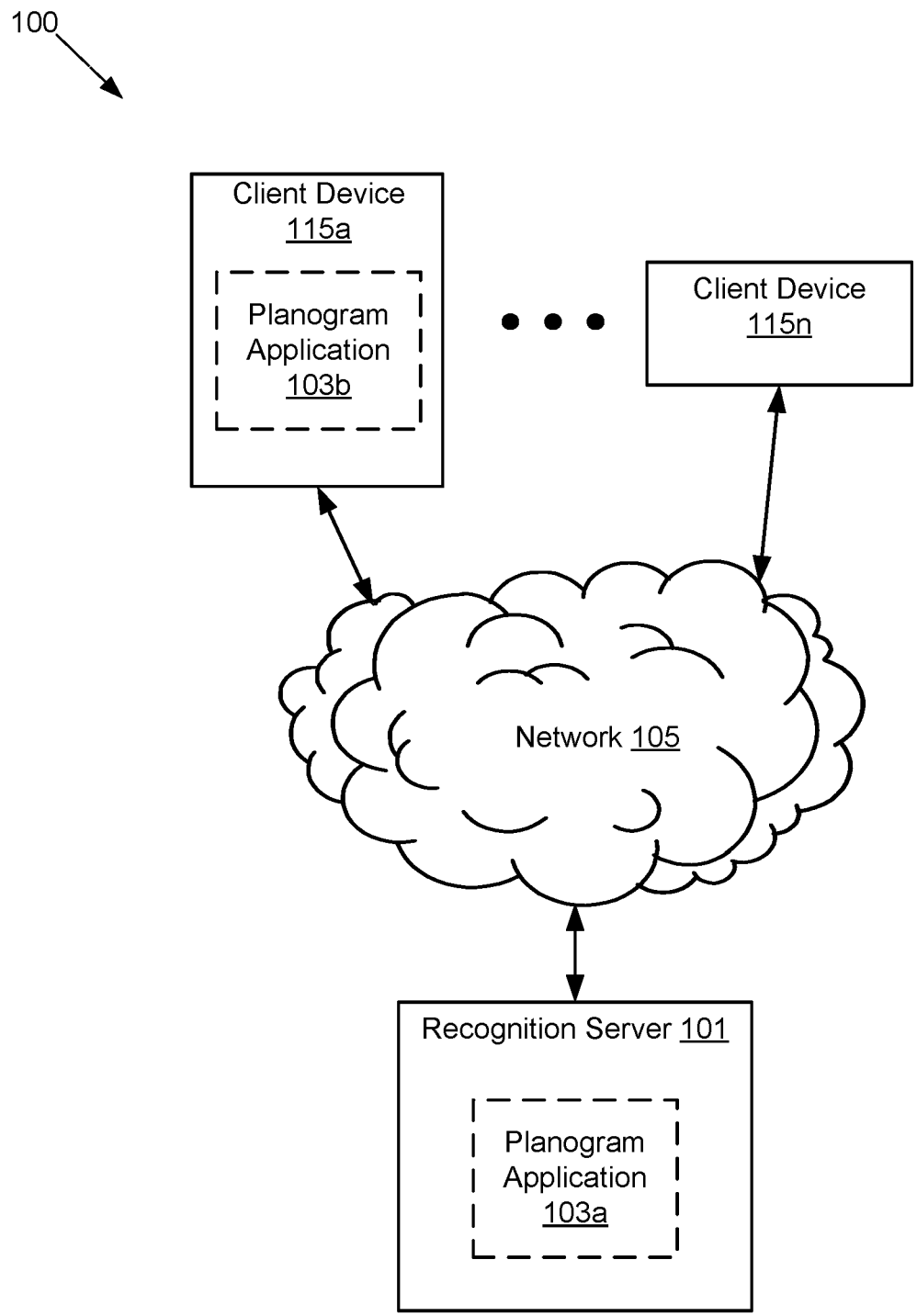
FIG. 1 is a high-level block diagram illustrating one embodiment of a system for generating a planogram.

FIG. 1 is a high-level block diagram illustrating one embodiment of a system 100 for generating a planogram. The illustrated system 100 may have one or more client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In some embodiments, the system 100 includes a recognition server 101 coupled to the network 105. The recognition server 101 may be, or may be implemented by, a computing device including a processor, a memory, applications, a database, and network communication capabilities. In the example of FIG. 1, the components of the recognition server 101 are configured to implement a planogram application 103a described in more detail below. In one embodiment, the recognition server 101 provides services to a consumer packaged goods (CPG) firm for identifying products on shelves, racks, or displays and determining a structured way to arrange a placement of the products. While the examples herein describe recognition of products in an image of shelves, such as a retail display, it should be understood that the image may include any arrangement of organized objects or items. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images to and from the client device 115. The images received by the recognition server 101 can include an image captured by the client device 115, an image copied from a website or an email, or an image from any other source. In another example, the recognition server 101 sends request for datasets and receives datasets including point of sales (POS) data, demographic data, pricing data, etc. from a plurality of third-party servers (not shown). Although only a single recognition server 101 is shown in FIG. 1, it should be understood that there may be any number of recognition servers 101 or a server cluster. The recognition server 101 may include data storage.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. For example, the client device 115 may include a graphics processor unit (GPU) for handling graphics and multimedia processing. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends a query image to the recognition server 101 and the recognition server 101 provides data in JavaScript Object Notation (JSON) format about one or more objects recognized in the query image to the client device 115. The client device 115 may support use of graphical application program interface (API) such as Metal on Apple iOS™ or RenderScript on Android™ for determination of feature location and feature descriptors during image processing.

The planogram application 103 may include software and/or logic to provide the functionality for generating a planogram. In some embodiments, the planogram application 103 can be implemented using programmable or specialized hardware, such as a field-programmable gate array (FPGA) or an application-specific integrated circuit (ASIC). In some embodiments, the planogram application 103 can be implemented using a combination of hardware and software. In other embodiments, the planogram application 103 may be stored and executed on a combination of the client devices 115 and the recognition server 101, or by any one of the client devices 115 or recognition server 101.

In some embodiments, the planogram application 103b may be a thin-client application with some functionality executed on the client device 115 and additional functionality executed on the recognition server 101 by the planogram application 103a. For example, the planogram application 103b on the client device 115 could include software and/or logic for capturing an image, transmitting the image to the recognition server 101, and displaying image recognition results. In another example, the planogram application 103a on the recognition server 101 could include software and/or logic for receiving the image, stitching the image into a larger composite image based on sufficient overlap with a previously received image, and generating image recognition results. In yet another example, the planogram application 103a on the recognition server 101 could include software and/or logic for generating a planogram from the image recognition results. The planogram application 103a or 103b may include further functionality described herein, such as, processing the image and performing feature identification.

In some embodiments, the planogram application 103 receives an image of a portion of a shelving unit. The planogram application 103 determines features of the image. The planogram application 103 identifies one or more items and a region of interest for the one or more items. The planogram application 103 identifies a plurality of facings. The planogram application 103 identifies one or more shelves corresponding to the plurality of facings. The planogram application 103 determines a recognition corresponding to the one or more items stacked in each of the plurality of facings. The planogram application 103 associates the recognition to an item at the bottom of the one or more items stacked in each of the plurality of facings. The planogram application 103 removes other items stacked on top of the item at the bottom in each of the plurality of facings. The planogram application 103 aligns bottom edge of items from the plurality of facings across each shelf. The planogram application 103 moves the items horizontally and inwards such that vertical edges of the items avoid overlapping. The planogram application 103 generates a planogram of the items. The operation of the planogram application 103 and the functions listed above are described below in more detail below with reference to FIGS. 3-5.

Figure 2:
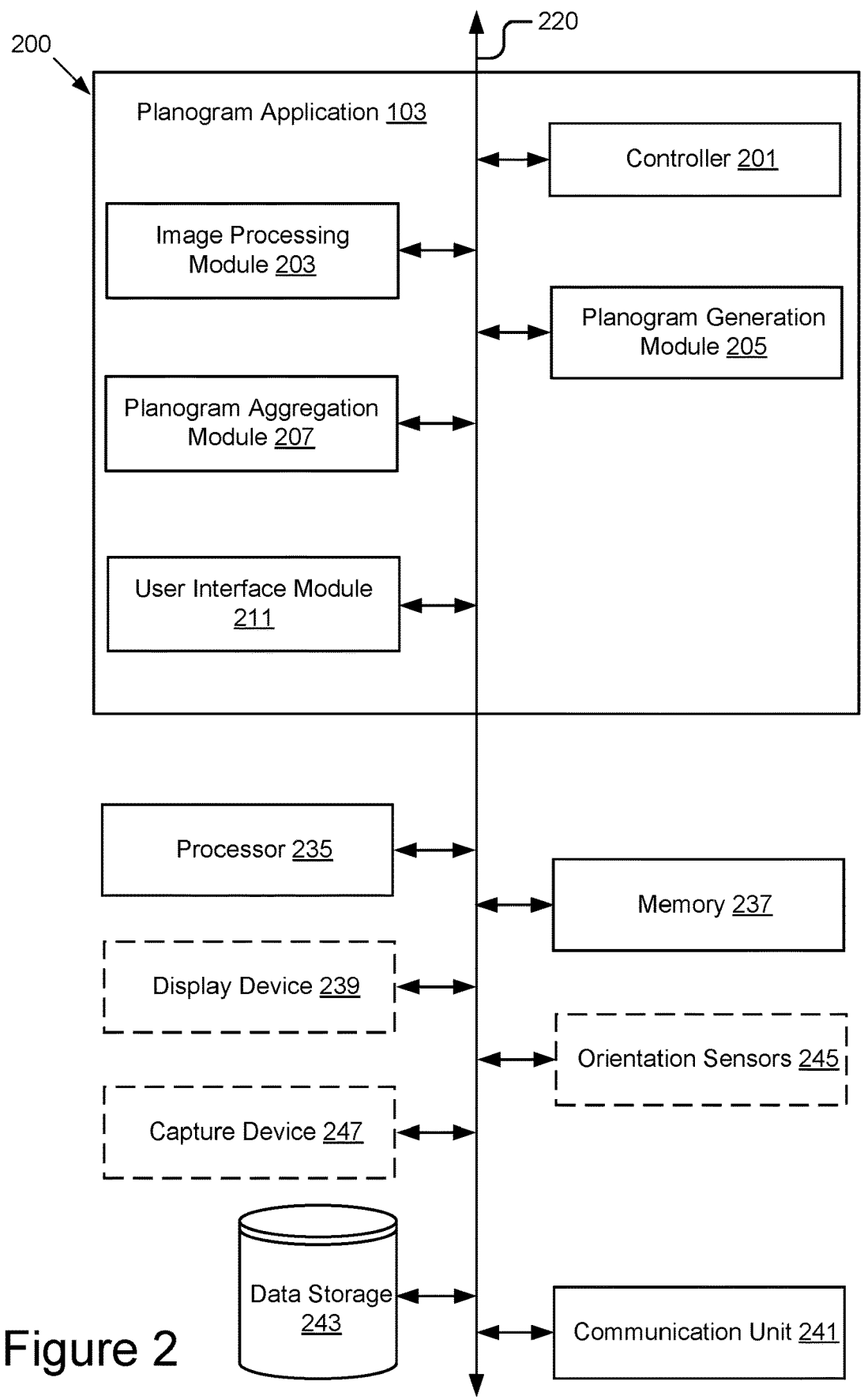
FIG. 2 is a block diagram illustrating one embodiment of a computing device including a planogram application.

FIG. 2 is a block diagram illustrating one embodiment of a computing device 200 including a planogram application 103. The computing device 200 may also include a processor 235, a memory 237, an optional display device 239, a communication unit 241, data storage 243, optional orientation sensors 245, and an optional capture device 247 according to some examples. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be the client device 115, the recognition server 101, or a combination of the client device 115 and the recognition server 101. In such embodiments where the computing device 200 is the client device 115 or the recognition server 101, it should be understood that the client device 115, and the recognition server 101 may include other components described above but not shown in FIG. 2.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the planogram application 103, and the data storage 243. It will be apparent to one skilled in the art that other processors, operating systems, sensors, displays, and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the planogram application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-Ray™, etc.). It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images, and data as described herein. In different embodiments, the display is binary (only two different values for pixels), monochrome (multiple shades of one color), or allows multiple colors and shades. The display device 239 is coupled to the bus 220 for communication with the processor 235 and the other components of the computing device 200. It should be noted that the display device 239 is shown in FIG. 2 with dashed lines to indicate it is optional. For example, where the computing device 200 is the recognition server 101, the display device 239 is not part of the system, where the computing device 200 is the client device 115, the display device 239 is included and is used to display images and associated recognition results.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image. The communication unit 241 also transmits information including recognition results to the client device 115 for display, for example, in response to processing the image. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS, and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory, or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for analyzing a received image and results of the analysis and other functionality as described herein. For example, the data storage 243 may store templates for a plurality of stock keeping units for image recognition purposes. A stock keeping unit (SKU) is a distinct item, such as a product offered for sale. The stock keeping unit includes all attributes that makes the item distinguishable as a distinct product from all other items. For example, the attributes include product identifier (e.g., Universal Product Code (UPC)), product name, dimensions (e.g., width, height, depth, etc.), size (e.g., liters, gallons, ounces, pounds, kilograms, fluid ounces, etc.), description, brand manufacturer, color, packaging, material, model number, price, discount, base image, etc. The term stock keeping unit or SKU may also refer to a unique identifier that refers to the particular product or service in the inventory. In some embodiments, the data storage 243 stores a received image and the set of features determined for the received image. The data storage 243 may similarly store one or more planograms and the set of patterns determined for the one or more planograms. Additionally, the data storage 243 may store datasets used in evaluating the patterns of the one or more planograms. The data stored in the data storage 243 is described below in more detail.

The orientation sensors 245 may be hardware-based or software-based, or a combination of hardware and software for determining position or motion of the computing device 200. In some embodiments, the orientation sensors 245 may include an accelerometer, a gyroscope, a proximity sensor, a geomagnetic field sensor, etc. In different embodiments, the orientation sensors 245 may provide acceleration force data for the three coordinate axes, rate of rotation data for the three coordinate axes (e.g., yaw, pitch and roll values), proximity data indicating a distance of an object, etc. It should be noted that the orientation sensors 245 are shown in FIG. 2 with dashed lines to indicate it is optional. For example, where the computing device 200 is the recognition server 101, the orientation sensors 245 are not part of the system, where the computing device 200 is the client device 115, the orientation sensors 245 are included and are used to provide sensor information for various motion or position determination events of the client device 200 described herein.

The capture device 247 may be operable to capture an image or data digitally of an object of interest. For example, the capture device 247 may be a high definition (HD) camera, a regular 2D camera, a multi-spectral camera, a structured light 3D camera, a time-of-flight 3D camera, a stereo camera, a standard smartphone camera, or a wearable computing device. The capture device 247 is coupled to the bus to provide the images and other processed metadata to the processor 235, the memory 237, or the data storage 243. It should be noted that the capture device 247 is shown in FIG. 2 with dashed lines to indicate it is optional. For example, where the computing device 200 is the recognition server 101, the capture device 247 is not part of the system, where the computing device 200 is the client device 115, the capture device 247 is included and is used to provide images and other metadata information described below with reference to FIGS. 3A-3G.

In some embodiments, the planogram application 103 may include a controller 201, an image processing module 203, a planogram generation module 205, a planogram aggregation module 207, and a user interface module 211. The components of the planogram application 103 are communicatively coupled via the bus 220. The components of the planogram application 103 may each include software and/or logic to provide their respective functionality. In some embodiments, the components of the planogram application 103 can each be implemented using programmable or specialized hardware including a field-programmable gate array (FPGA) or an application-specific integrated circuit (ASIC). In some embodiments, the components of the planogram application 103 can each be implemented using a combination of hardware and software executable by the processor 235. In some embodiments, the components of the planogram application 103 may each be stored in the memory 237 and be accessible and executable by the processor 235. In some embodiments, the components of the planogram application 103 may each be adapted for cooperation and communication with the processor 235, the memory 237, and other components of the planogram application 103 via the bus or software communication mechanism 220.

The controller 201 may include software and/or logic to control the operation of the other components of the planogram application 103. The controller 201 controls the other components of the planogram application 103 to perform the methods described below with reference to FIGS. 4-6. The controller 201 may also include software and/or logic to provide the functionality for handling communications between the planogram application 103 and other components of the computing device 200 as well as between the components of the planogram application 103.

In some embodiments, the controller 201 sends and receives data, via the communication unit 241, to and from one or more of the client device 115 and the recognition server 101. For example, the controller 201 receives, via the communication unit 241, an image from a client device 115 operated by a user and sends the image to the image processing module 203. In another example, the controller 201 receives data for providing a graphical user interface to a user from the user interface module 211 and sends the data to a client device 115, causing the client device 115 to present the user interface to the user.

In some embodiments, the controller 201 receives data from other components of the planogram application 103 and stores the data in the data storage 243. For example, the controller 201 receives data including features identified for an image from the image processing module 203 and stores the data in the data storage 243. In other embodiments, the controller 201 retrieves data from the data storage 243 and sends the data to other components of the planogram application 103. For example, the controller 201 retrieves data including a set of planograms from the data storage 243 and sends the retrieved data to the planogram aggregation module 207.

In some embodiments, the communications between the planogram application 103 and other components of the computing device 200 as well as between the components of the planogram application 103 can occur autonomously and independent of the controller 201.

The image processing module 203 may include software and/or logic to provide the functionality for receiving and processing one or more images of a shelving unit from the client device 115. For example, the images may be images of the shelving unit depicting a current layout of shelves in one or more retail stores.

In some embodiments, the image processing module 203 receives one or more images of a shelving unit from the client device 115. The images may be received for recognition and may include multiple items of interest. For example, the image can be an image of packaged products on a shelving unit (e.g., coffee packages, breakfast cereal boxes, soda bottles, etc.) which reflects the real situation on the shelves in a retail store. A packaged product of a brand manufacturer may include textual and pictorial information printed on its surface that distinguishes it from packaged products belonging to one or more other brand manufacturers. The packaged products may also sit in an orientation on the shelf exposed to the user looking at the shelf. For example, a box-like packaged product might be oriented with the front of the product exposed to the user looking at the shelf. In some embodiments, the image processing module 203 determines whether successful recognition is likely on the received image and instructs the user interface module 211 to generate graphical data including instructions for the user to retake the image if a section of the image captured by the client device 115 has limited information for complete recognition (e.g., a feature rich portion is cut off), the image is too blurry, the image has an illumination artifact (e.g., excessive reflection), etc.

In some embodiments, the image processing module 203 may process the one or more images serially or in parallel. The image processing module 203 determines a set of features for the received image. For example, the image processing module 203 may determine a location (X-Y coordinates), an orientation, and an image descriptor for each feature identified in the received image. In some embodiments, the image processing module 203 uses corner detection algorithms for determining feature location. For example, the corner detection algorithms can include Shi-Tomasi corner detection algorithm, Harris and Stephens corner detection algorithm, etc. In some embodiments, the image processing module 203 uses feature description algorithms for determining efficient image feature descriptors. For example, the feature description algorithms may include Binary Robust Independent Elementary Features (BRIEF), Scale-Invariant Feature Transform (SIFT), Speeded Up Robust Features (SURF), etc. An image descriptor of a feature may be a 256-bit bitmask which describes the image sub-region covered by the feature. In some embodiments, the image processing module 203 may compare each pair of 256 pixel pairs near the feature for intensity and based on each comparison, the feature extraction module 203 may set or clear one bit in the 256-bit bitmask.

In some embodiments, the image processing module 203 matches the features of the received image with the features of templates stored for a plurality of items in the data storage 243 for image recognition. The image processing module 203 identifies a region of interest (ROI) bordering each of the matched items in the received image. A region of interest can be of any shape, for example, a polygon, a circle with a center point and a diameter, a rectangular shape of a width, a height and one or more reference points for the region (e.g., a center point, one or more corner points for the region), etc. For example, the region of interest may border the matched item in its entirety. In another example, the region of interest may border the exposed labeling containing pictorial and textual information associated with the matched item. The image processing module 203 recognizes an item or product associated with the region of interest based on matching the image features in the received image with the template features stored for a plurality of items. Symbolic information or metadata provided in a recognition result for an identified item may include a UPC, position data (e.g., a slot position on a shelf, a particular shelf off the ground, etc.) and metadata (e.g., brief product description, brand manufacturer, dimensions, size, color, price, base image, model number, etc.). The image processing module 203 generates a realogram based on the recognition results for the plurality of items in the received image. The realogram includes a structured representation of the symbolic information of the items recognized in the image.

In some embodiments, the image processing module 203 may receive the one or more images of the shelving unit, stitch the images of the shelving unit into a single linear panoramic image (e.g., a composite image) and store the panoramic image in the data storage 243. In some embodiments, the image processing module 203 determines the features of the panoramic image and matches the determined features with the features of templates stored for a plurality of items in the data storage 243 for performing image recognition of items in the panoramic image. In some embodiments, the image processing module 203 sends the data including recognition results and associated regions of interest of the image of the shelving unit to the planogram generation module 205. In other embodiments, the image processing module 203 stores the data including recognition results and associated region of interests of the image of the shelving unit in the data storage 243.

The planogram generation module 205 may include software and/or logic to provide the functionality for generating a planogram. In some embodiments, the planogram generation module 205 receives the realogram, recognition results for items matched in the image and associated regions of interest from the image processing module 203. In some embodiments, the realograms may be associated with a single retail store or multiple retail stores. Typically, a planogram may have one item represented at each position on the shelf of the shelving unit. In some embodiments, the planogram generation module 205 generates a planogram by normalizing the image recognition result, as described in more detail below. In some embodiments, the planogram generation module 205 identifies patterns across multiple realograms. The patterns may be used to synthesize an idealized planogram and to visualize patterns per SKU as described elsewhere herein.

Figure 3A:
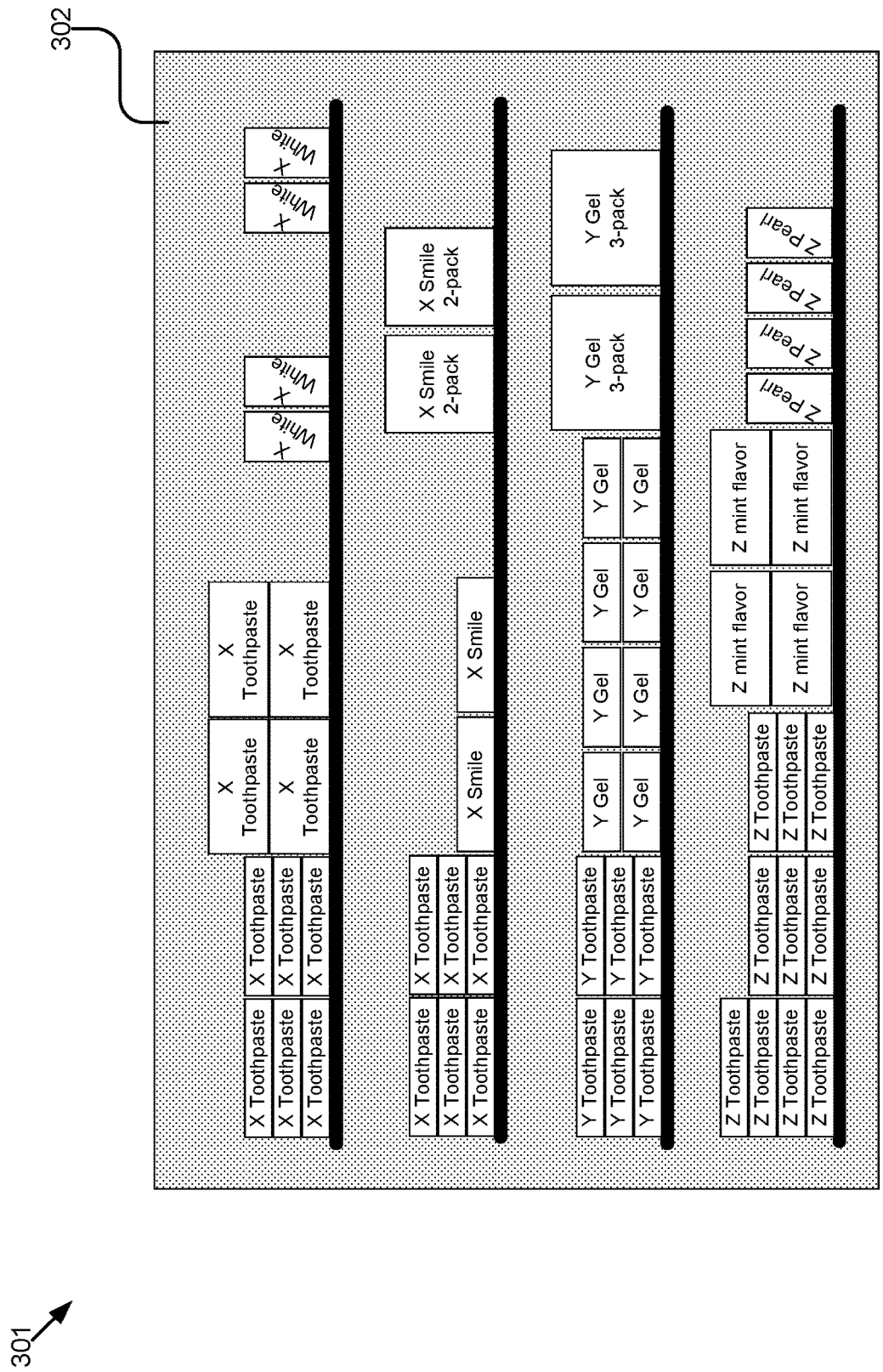
FIG. 3A-3H are graphical representations of one embodiment of a process for generating a planogram from a realogram of a portion of a shelving unit.
Figure 3B:
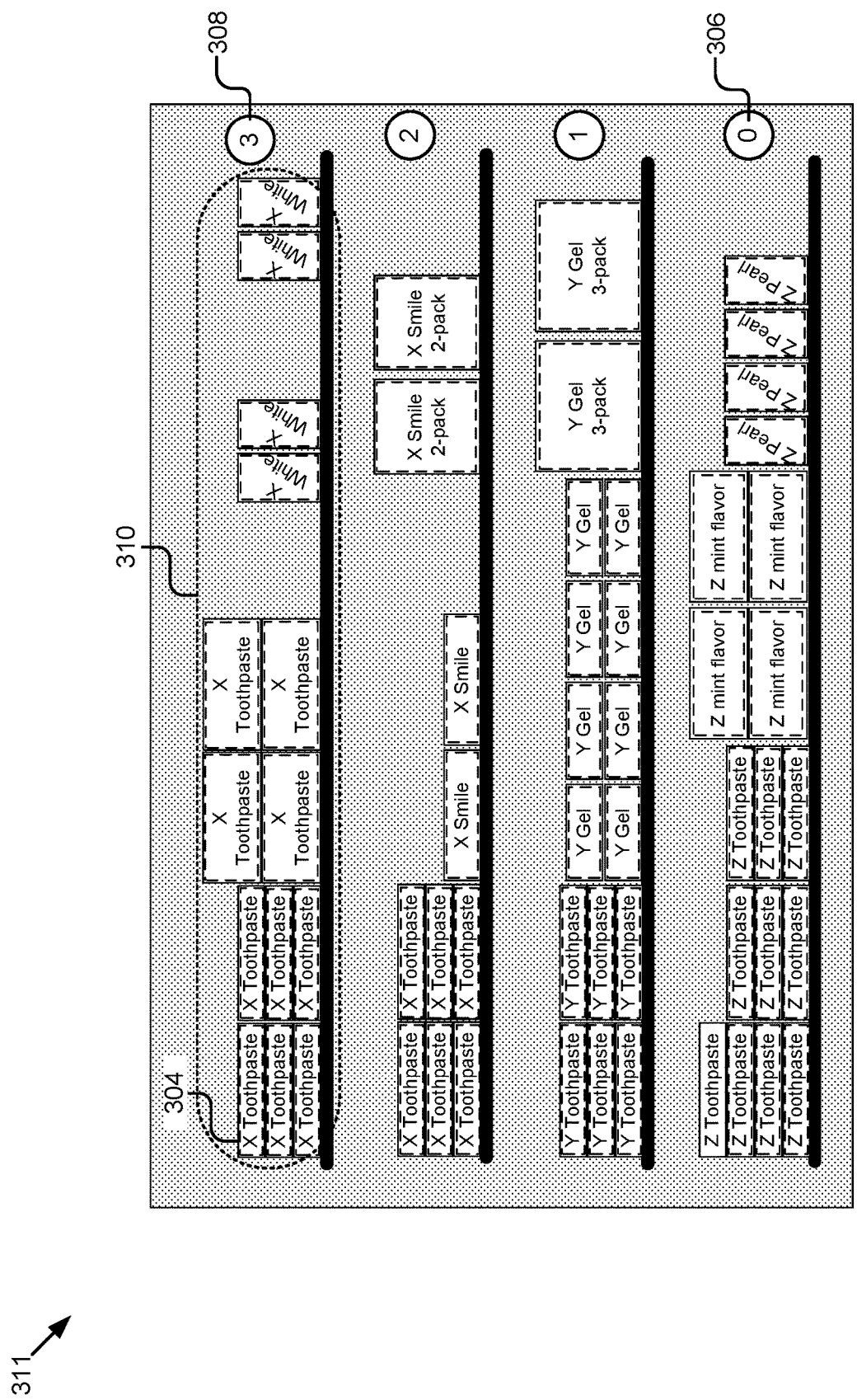

In some embodiments, the planogram generation module 205 generates a planogram by executing a series of normalization steps on the realogram(s) including the recognition results. As shown in the example of FIGS. 3A-3H, the graphical representations illustrate one embodiment of a process for generating a planogram from a realogram. In FIG. 3A, the graphical representation 301 includes an image 302 of a portion of a shelving unit. In some embodiments, the image 302 can be a stitched image from multiple overlapping images. In other embodiments, the image 302 can be a single image. In some embodiments, the planogram generation module 205 identifies a plurality of facings in a realogram based on recognition results for items in the image 302. A facing can be a vertical stacking of one or more items on a shelf turned out towards the customer. For example, a set of toothpaste products, each in a box-like package may be stacked on top of one another to form a facing at a single position of the shelf. The one or more items in the facing are designed to represent an identical product (or same SKUs). However, if the items get misplaced on the shelving unit, the facing may become mixed. For example, a toothpaste brand 'X' may be misplaced on top of the toothpaste brand 'Y' in the facing meant for the toothpaste brand 'Y' and thus the facing can become a mixed facing. As shown in the example of FIG. 3B, the graphical representation 311 illustrates a facing 304, the left most facing of the four facings for "X Toothpaste" on the topmost shelf 308, identified using the realogram for the stack of "X Toothpaste" items. In the graphical representation 311, each facing includes a region of interest corresponding to the identified items in the facing to indicate that the items are recognized.

In some embodiments, the planogram generation module 205 identifies that a horizontal linear grouping of one or more facings corresponds to a shelf (e.g., a linear group). In some embodiments, the planogram generation module 205 numbers the shelves in the shelving unit. As shown in the example of FIG. 3B, the planogram generation module 205 identifies the shelves from bottom to top with the bottom-most shelf 306 identified as '0' and the top-most shelf 308 identified as '3.' Other forms of identification of the shelves may be possible. For example, the planogram generation module 205 may number the shelves from top to bottom.

In some embodiments, the planogram generation module 205 identifies a group of items that share a same brand (i.e., a brand chunk) within a shelf. The planogram generation module 205 identifies the brand chunk based on the metadata of recognized items in the realogram. For example, as depicted in FIG. 3B, the planogram generation module 205 identifies the top-most shelf 308 as including a brand chunk 310 for a group of brand X toothpastes. In some embodiments, a brand chunk may include items of a same brand but belonging to different categories. For example, a toothpaste item and a toothbrush of the same brand may be considered a brand chunk.

In some embodiments, the planogram generation module 205 identifies a confidence score of the recognition associated with one or more matched items in a facing. The planogram generation module 205 uses the confidence scores to determine a recognition to assign to the plurality of facings identified in the image of the shelving unit. In some embodiments, the planogram generation module 205 determines a recognition to assign to a facing based on the number of recognitions for each item with the facing. For example, if there are three items stacked in a mixed facing, the planogram generation module 205 identifies that recognition result for two of the items relate to a stock keeping unit (SKU) "X Toothpaste" and a recognition result for one of the items to a SKU "Y Toothpaste." The planogram generation module 205 performs a weighting of the recognition associated with the three items within the facing and determines SKU "Toothpaste X" as the most likely recognition of each item in the facing. In some embodiments, the planogram generation module 205 uses an identity of the recognized items in neighboring facings to verify which candidate recognition of an item to recommend as the most likely item for a facing under consideration.

Figure 3C:
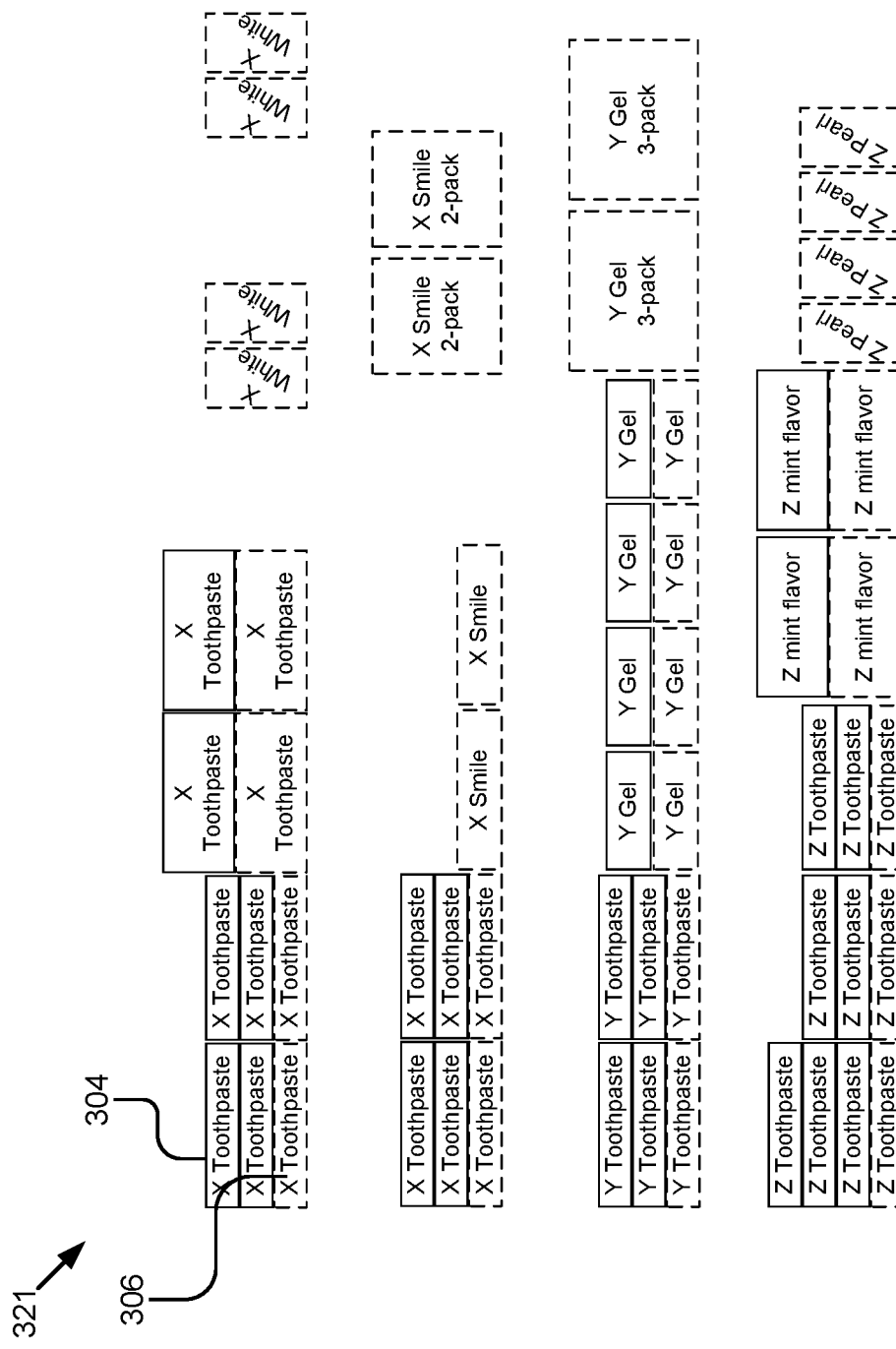
Figure 3D:
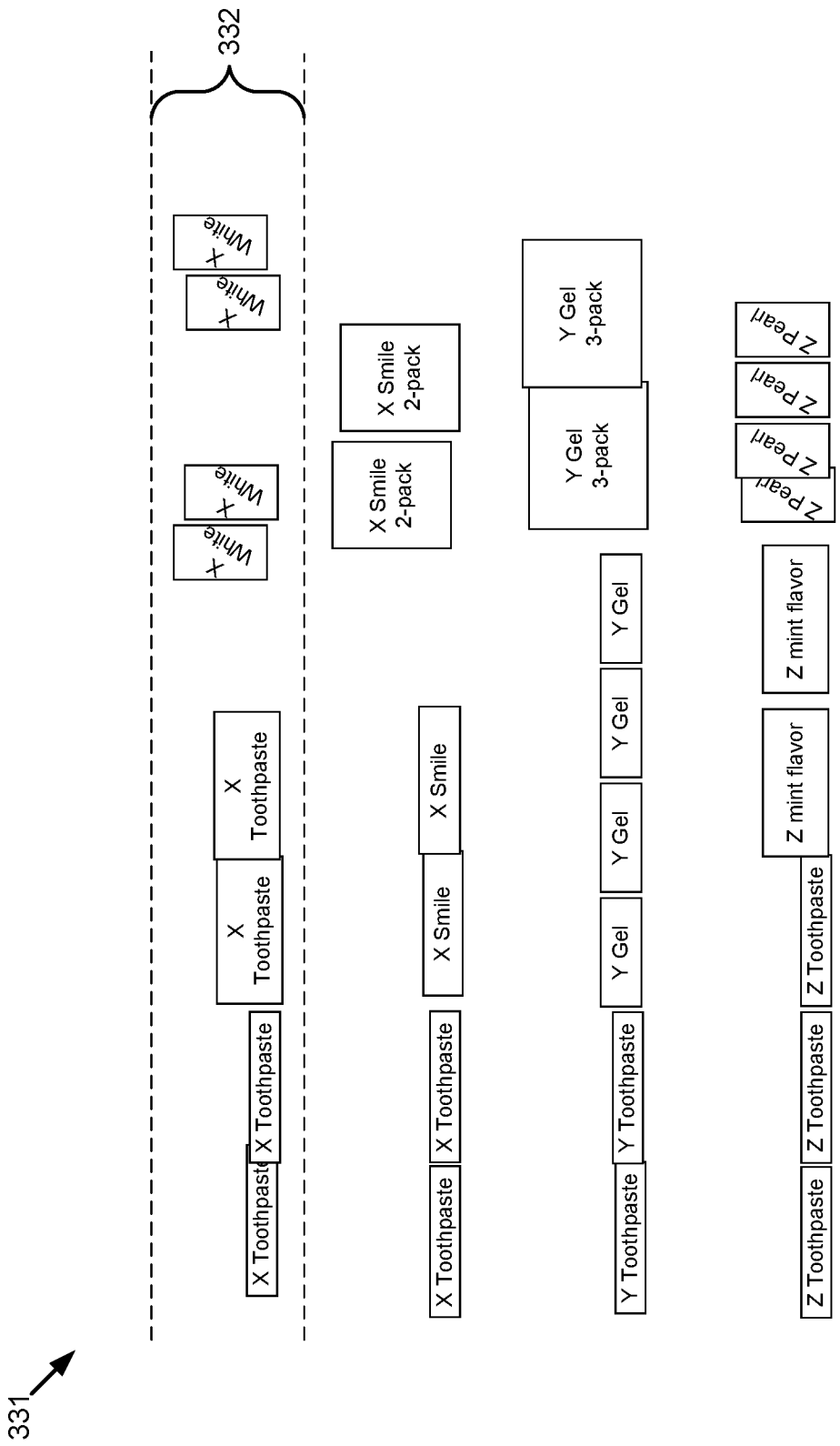

In some embodiments, the planogram generation module 205 associates the recognition for the identified facing to an item in the facing. For example, the planogram generation module 205 associates the recognition to an item at the bottom of the facing in the image of the shelving unit. As shown in the example of FIG. 3C, the graphical representation 321 illustrates isolating facings from a realogram. The recognition result of the bottom-most item 306 in the facing 304 is associated with the facing 304 as representative of the items included in the facing 304. In some embodiments, the planogram generation module 205 removes other items from the identified facing after a recognition of an item is applied to the facing. For example, the planogram generation module 205 removes items stacked on top of the item at the bottom of the identified facing in the image of the shelving unit. As shown in the example of FIG. 3D, the graphical representation 331 illustrates how the recognition is associated with the bottom-most item 306 in FIG. 3C and remaining items in FIG. 3C are removed.

Figure 3E:
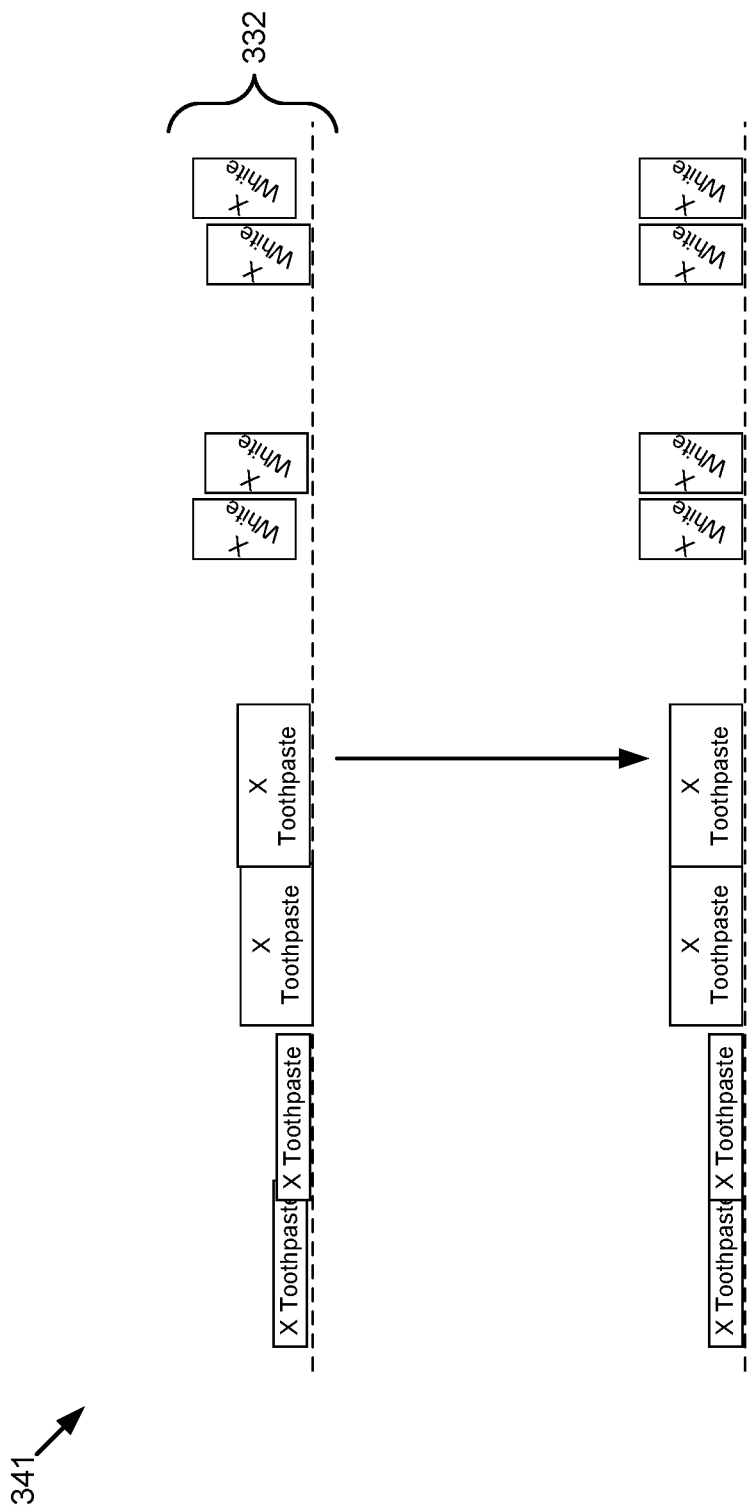

When a recognition is applied to the facings on a shelf, the recognitions may slightly become askew relative to each other and/or overlap with each other. For example, as shown in FIG. 3D, the recognition items (e.g., based on regions of interested associated with the items) belonging to a shelf or linear group 332 are out of vertical alignment with each other and overlap with other recognition items on the left and/or the right. In some embodiments, the planogram generation module 205 aligns the edges of items belonging to a shelf or a linear group. As shown in the example of FIG. 3E, the graphical representation 341 illustrates aligning the edges of items belonging to a shelf. In FIG. 3E, a dashed line is shown as a reference to emphasize the misalignment of bottom edges of the items. The planogram generation module 205 aligns the bottom edges of the items placed across the shelf 332. Other types of alignment for items may be possible. For example, if the items are hung from a hang tab on a shelf, the planogram generation module 205 aligns the top edges of the items.

Figure 3F:
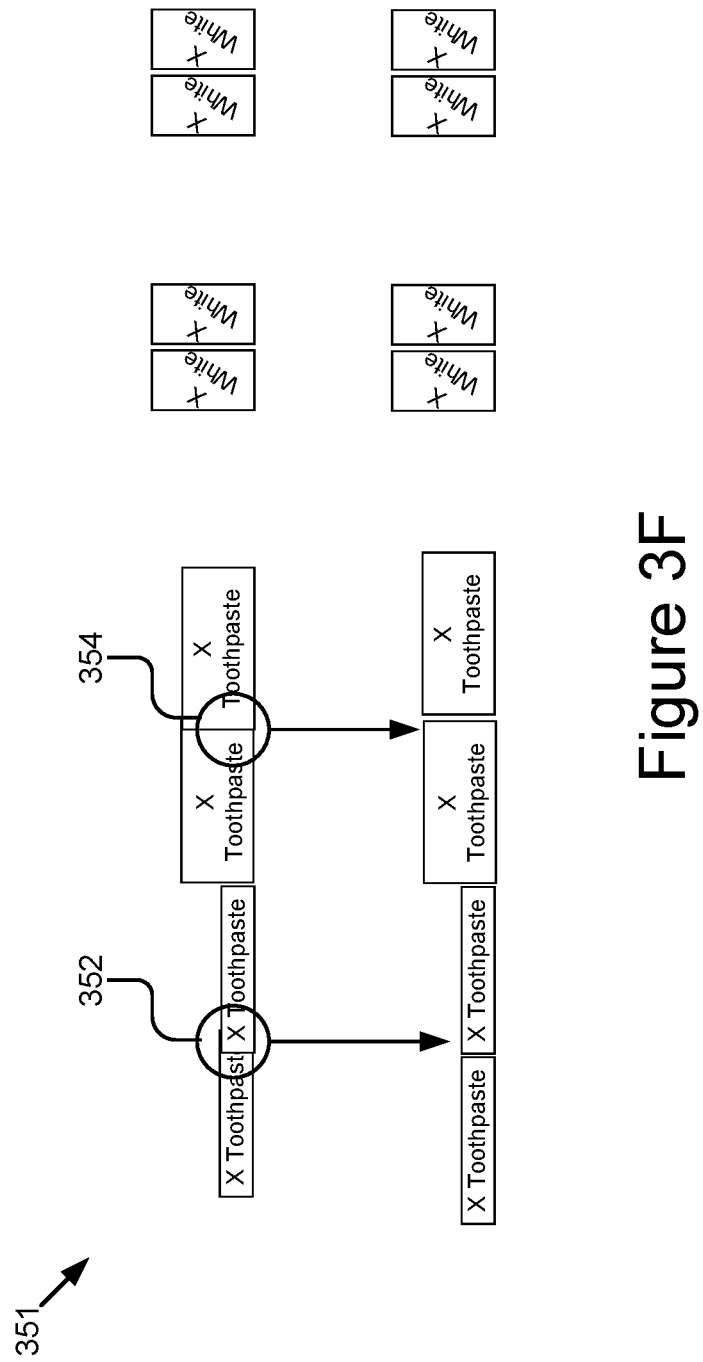

In some embodiments, the planogram generation module 205 resolves an overlap between the items on a shelf. The planogram generation module 205 moves the items minimally across each shelf such that the items are spaced apart and occupy non-overlapping positions. As shown in the example of FIG. 3F, the graphical representation 351 illustrates resolving an overlap between items across a shelf. The planogram generation module 205 identifies a first overlap 352 and a second overlap 354 between items belonging to a shelf. The planogram generation module 205 shuffles the items horizontally such that the vertical edges of the items do not overlap with each other and are spaced apart from each other. The planogram generation module 205 continues to move the items until the overlaps 352 and 354 get resolved as shown in FIG. 3F. The planogram generation module 205 determines the movement of the items such that a few of the items may be subject to movement and the movement may be as minimal as possible. The planogram generation module 205 moves the items inwards from the left and right edges so as to establish a clear boundary for the overall planogram and to avoid moving the items beyond the planogram boundary.

In some embodiments, the planogram generation module 205 determines a number of slots in a shelf. A slot is an ordinal position of the recognition associated with an item in that location (or facing) in the shelf In some embodiments, the planogram generation module 205 generates a numbering of the slots. The numbering can identify which item is in which numbered slot on the shelf. For example, the planogram generation module 205 numbers the slots from left to right (or right to left) of the shelf In some embodiments, the planogram generation module 205 identifies a gap within the shelf. A gap is a portion of the shelf that is devoid of recognition associated with an item. For example, the realogram from a retail store used for generating the planogram may include an empty spot due to the customers picking all the products from a stocked facing on the shelf of the retail store. The planogram generation module 205 identifies such empty spots as gaps. In some embodiments, the planogram generation module 205 instructs the image processing module 203 to receive an image of the shelving unit at a later date if there are gaps. In other embodiments, the planogram generation module 205 instructs the user interface module 211 to generate a notification for the user to identify the missing SKU at the gap.

Figure 3G:
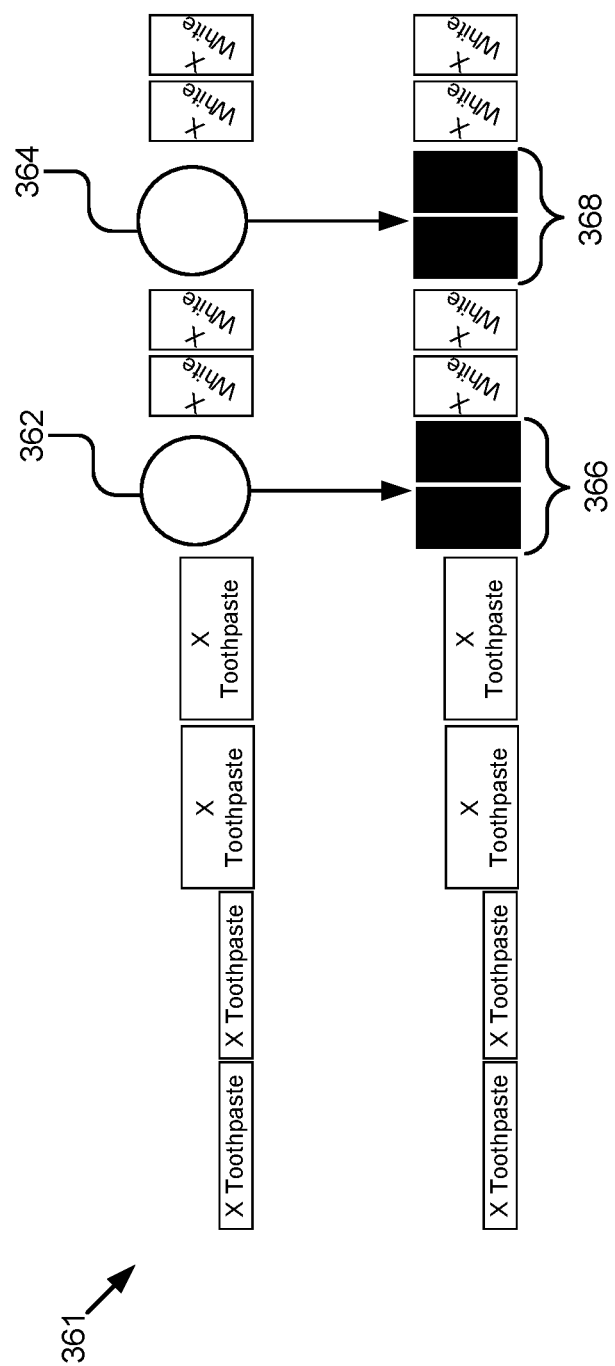

In some embodiments, the planogram generation module 205 determines whether a width of the gap is as wide as items in either of the neighboring slots identified on the planogram. The planogram generation module 205 determines whether the width of the gap is a multiple of the widths of items in either of the neighboring slots. The planogram generation module 205 identifies the number of slots potentially hidden within the gap based on the width of the gap being a multiple of the widths of items in either of the neighboring slots. For example, if the pixel width of the gap is 400 pixels wide, an item in a first neighboring slot on the left is 300 pixels wide and an item in a second neighboring slot on the right is 200 pixels wide in a planogram, the planogram generation module 205 determines that the width of the gap is a multiple of the width of the item in the second neighboring slot. The planogram generation module 205 determines the width of the item in the second neighboring slot as the best fit and identifies that there are two potential slots (i.e., gap slots) for items each 200 pixels wide within the gap. As shown in the example of FIG. 3G, the graphical representation 361 illustrates estimating slots within a gap. The planogram generation module 205 identifies a first gap 362 and a second gap 364 within a shelf of items. The planogram generation module 205 determines that there are a pair of gap slots 366 within the first gap 362 and another pair of gap slots 368 within the second gap 364.

Figure 3H:
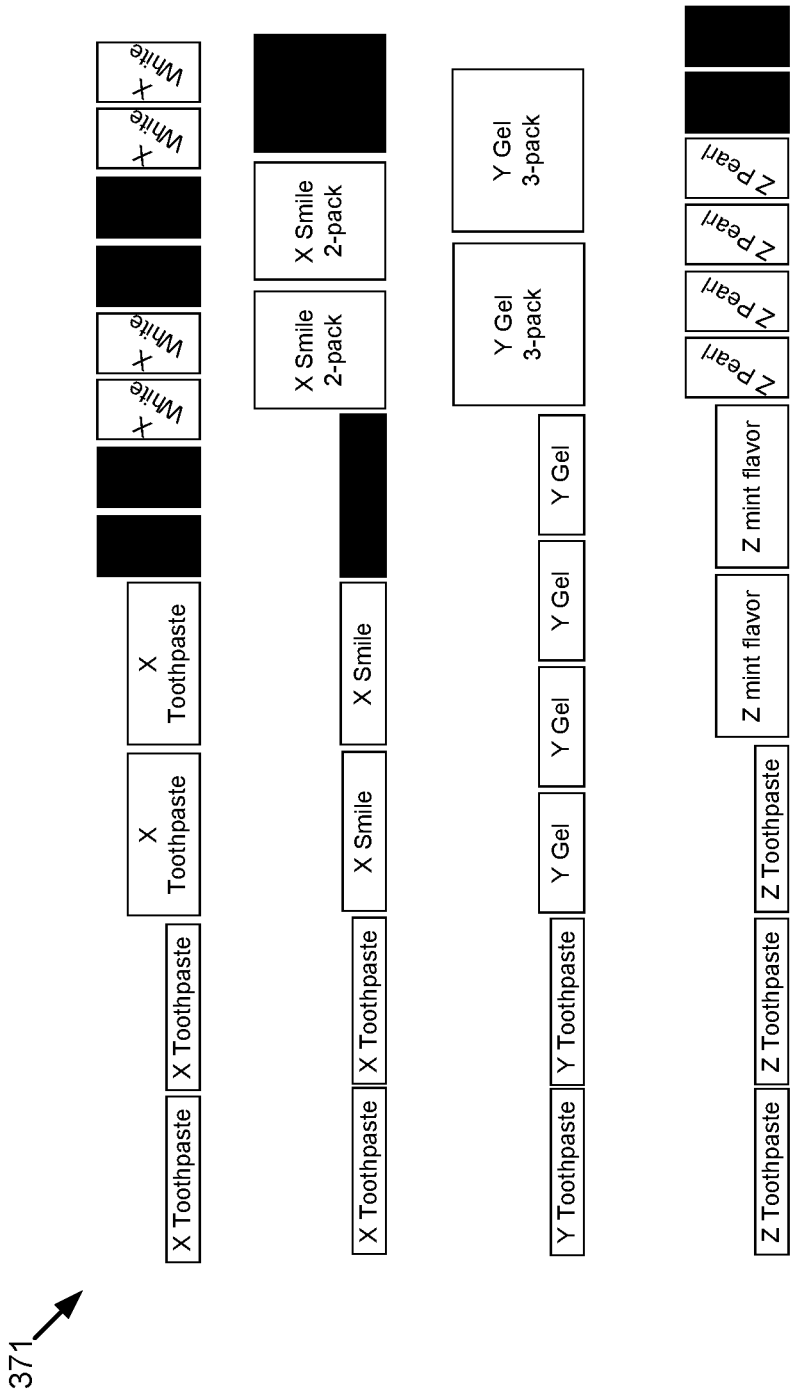

In some embodiments, the planogram generation module 205 sends instructions to the user interface module 211 to generate graphical data for displaying a planogram generated by executing the above described series of normalization steps on the realogram. As shown in the example of FIG. 3H, the graphical representation 371 illustrates a display of the planogram generated from a realogram of the shelving unit. In some embodiments, the planogram can be symbolic. The planogram generation module 205 aggregates the product identifier, product name, brand, width, height, base product image, etc. in a structured table representation to describe the planogram symbolically.

As there can be gaps (e.g., missing products/empty slots) in one realogram, a planogram generated from one realogram may not be a complete representation of an underlying planogram. It may be beneficial to receive and harmonize multiple realograms of a shelving unit from a retail store over time. For example, a realogram captured at a later time can be compared to the planogram generated from a previous realogram to create a rolling planogram. In such a scenario, the planogram is updated with new information every time a new realogram is captured in a time series. For example, the series of realograms can be captured successively week after week, day after day, hour after hour, and so on over a continuous interval of time. This may fill in the gaps of the planogram with new data over time and result in a much more detailed representation of the planogram which, otherwise, would not be possible with just one realogram.

In some embodiments, the planogram generation module 205 identifies one or more brand chunks in a planogram generated from a first realogram in a time series of realograms. The planogram generation module 205 receives the next realogram in the series of realograms and recognition results for items recognized from the next realogram. The planogram generation module 205 aligns the next realogram with the planogram and performs a comparison of recognition results from the next realogram against the planogram. In some embodiments, the realogram and the planogram are not physically aligned, but a relative location in the realogram and planogram are computed.

In some embodiments, the planogram generation module 205 performs the comparison to identify whether an item in the next realogram is aligned with a gap slot of the planogram. The planogram generation module 205 updates the planogram by placing the item in the gap slot of the planogram based on the item being aligned with the gap slot. In some embodiments, the planogram generation module 205 performs the comparison to identify whether a new item in the next realogram is aligned with a slot previously accounted for by an old item in the planogram. The planogram generation module 205 determines whether the slot is in an existing brand chunk identified within the planogram and whether the new item is a same brand as the existing brand chunk. If the new item is the same brand as the existing brand chunk, the planogram generation module 205 updates the planogram by replacing the old item with the new item in the slot. If the new item is not the same brand as the existing brand chunk, the planogram generation module 205 ignores the new item. For example, the new item in the next realogram may have been misplaced in the middle of a different brand chunk due to a customer action. In some embodiments, the updated planogram may become a rolling planogram and the planogram generation module 205 continues to update the rolling planogram by comparing with subsequent realograms in the time series.

In some embodiments, the planogram generation module 205 sends data including the planogram to the planogram aggregation module 207. In other embodiments, the planogram generation module 205 stores the data including the planogram in the data storage 243.

The planogram aggregation module 207 may include software and/or logic to provide the functionality for aggregating planograms to create a representative planogram. Such a representative planogram may aid in visualizing patterns by empirically sampling the series of planograms. For example, consider that a cluster of retail stores suddenly experience an upswing in sales performance. It may be beneficial to create a representative planogram by aggregating the planograms from a subset of the cluster of retail stores. The representative planogram may be recommended to other retail stores to replicate the strong sales performance witnessed in the cluster of retail stores. The representative planogram may preserve the prominent patterns identified in the set of aggregated planograms and place items of like category together on the shelf.

In some embodiments, the planogram aggregation module 207 aggregates planograms belonging to various retail stores. The retail stores may share a common characteristic that determines whether the planograms from these retail stores can be aggregated so as to create a representative planogram or a master planogram. For example, the common characteristic may include a format of the retail store, a size of the retail store, customer demographics of the retail store, geographical location, etc. In some embodiments, the planogram aggregation module 207 aggregates the planograms belonging to a similar or common product category. For example, the aggregated planograms may relate to beverage items. In some embodiments, the planograms that are aggregated by the planogram aggregation module 207 may be received from the planogram generation module 205. As described previously, the planogram generation module 205 generates the planograms by normalizing the realograms of the shelving unit in the retail stores.

In some embodiments, the planogram aggregation module 207 aggregates the planograms and categorizes the planograms into different size groups. The planogram aggregation module 207 identifies common size breakpoints and categorizes the planograms into separate groups based on the breakpoints. For example, there may be five planograms from one or more small format retail stores (e.g., a 4 feet long by 6 feet high retail shelving unit) and three planograms from one or more large format retail stores (e.g., a 4 feet long by 10 feet high retail shelving unit). The planogram aggregation module 207 categorizes the five planograms from small format retail stores into a first group and the three planograms from large format retail stores into a second group. This is beneficial because it may ensure that the planograms categorized into one group have a similar number of items and/or sizes of items. In some embodiments, the planogram aggregation module 207 processes each categorized group of planograms individually to determine a representative planogram for that size group.

In some embodiments, the planogram aggregation module 207 identifies one or more brand chunks in an aggregated planogram. An aggregated planogram may include metadata of items positioned on shelves. The metadata may include a brand name or brand description associated with the item. The planogram aggregation module 207 determines a group of items on a shelf that have a common brand name and identifies the group of items as a brand chunk. In some embodiments, there can be more than one brand chunk per shelf or linear group of the planogram. In some embodiments, the planogram aggregation module 207 identifies connections among the brand chunks in the aggregated planograms. In some embodiments, the planogram aggregation module 207 identifies connections among the brand chunks by determining measures of distance or similarity among the brand chunks. For example, the planogram aggregation module 207 determines a Euclidean distance among the brand chunks. The planogram aggregation module 207 identifies a set of patterns in an aggregated planogram from the connections identified among the brand chunks. The set of patterns may serve as a lightweight fingerprint for the planogram.

In some embodiments, the planogram aggregation module 207 normalizes planogram orientation for the aggregated planograms. For example, in the set of aggregated planograms, one planogram may be a left-to-right planogram and another planogram may be a right-to-left planogram (i.e., the planograms may be mirror images of each other). The planogram aggregation module 207 selects a planogram and the set of patterns in the planogram from identifying the connections among the brand chunks. The planogram aggregation module 207 compares the set of patterns in the planogram with the next planogram in the set of aggregated planograms to identify a best fit per linear group (e.g., brand order and position) in terms of distance measures. The planogram aggregation module 207 checks both left-to-right and right-to-left planogram orientation and identifies which one of the two is a better fit. The planogram aggregation module 207 aggregates each of the other planograms and flips the planograms accordingly if needed to match the best fit until the orientation of the aggregated planograms is normalized.

In some embodiments, the planogram aggregation module 207 determines a typical number of shelves across the aggregated planograms of similar size. For example, the planogram aggregation module 207 determines a median number of shelves as the typical number of shelves. The planogram aggregation module 207 incorporates this median number of shelves as the number of shelves in the representative planogram. The planogram aggregation module 207 determines whether a planogram in the set of aggregated planograms has more than the typical number of shelves. In some embodiments, the planogram aggregation module 207 discards the planogram if the planogram has a different number of shelves than the typical number of shelves. In other embodiments, the planogram aggregation module 207 reassigns the planogram with a typical number of shelves to the appropriate size group of planograms for separate processing into a representative planogram of that size group.

In some embodiments, the planogram aggregation module 207 evaluates each shelf across the aggregated planograms of similar size for creating the representative planogram. The planogram aggregation module 207 identifies a typical brand chunk for each shelf within the aggregated planograms. For example, the planogram aggregation module 207 identifies a common pattern of brand chunks that appears in the top most shelf for all the planograms within the aggregated planograms as the typical pattern of brand chunks for the top most shelf In some embodiments, the planogram aggregation module 207 determines a typical size of a brand chunk identified as being typical in each shelf within the aggregated planograms. The planogram aggregation module 207 identifies an average number of slots and an average slot width for each brand chunk in each shelf. For example, the planogram aggregation module 207 identifies every instance of the common pattern of brand chunk identified in the top most shelf across the aggregated planograms and determines an average number of slots and an average slot width for that common pattern of brand chunk. In some embodiments, the planogram aggregation module 207 creates a priority list of items for a typical brand chunk for each shelf across the aggregated planograms. The planogram aggregation module 207 determines a frequency of appearance for items within each instance of a brand chunk identified as being typical within the aggregated planograms. The priority list of items defines the most common items in the brand chunk and the priority list is weighted based on the frequency of appearance associated with the items. For example, the items in the priority list of items are sorted by frequency of appearance. In some embodiments, the planogram aggregation module 207 identifies neighbor rules and facing rules applicable for each item in a typical brand chunk. The planogram aggregation module 207 creates an array of facing frequencies for each item in a brand chunk. For example, the planogram aggregation module 207 identifies how often item A appeared in single facings, double facings (e.g., two facings side by side), etc. in an array of facing frequencies for item A. The planogram aggregation module 207 creates an array of next-to values for each item in a brand chunk. For example, the planogram aggregation module 207 identifies how often item A appeared next to item B from the priority list of a brand chunk, how often item A appeared next to item C from the priority list of the brand chunk, etc. in the array of next-to values for item A.

The planogram aggregation module 207 determines how to place items into which position of slots in the representative planogram. In some embodiments, the planogram aggregation module 207 selects the most common items from the typical brand chunk for placing into slots on a shelf of the representative planogram. In some embodiments, the planogram aggregation module 207 assigns a placement for items into slots on a shelf of the representative planogram based on the typical number of facings and a best fit of next-to values for the items. For example, the planogram aggregation module 207 identifies that item A is a common item in a typical brand chunk and has a typical number of facings equal to two and that the item A has appeared next to item B three times. Based on this determination, the planogram aggregation module 207 places item A and item B as neighboring items into slots on the shelf of the representative planogram. In some embodiments, the planogram aggregation module 207 determines an average (x, y) position for an item and uses the average (x, y) position to make a placement decision. For example, the planogram aggregation module 207 determines a common slot position/location associated with an item. The planogram aggregation module 207 determines whether more than one item is vying for the same slot position in the representative planogram and selects the item with less variability in average (x, y) position to be placed in the slot. For example, the planogram aggregation module 207 selects the item with a smaller standard deviation to place in the slot.

In some embodiments, the planogram aggregation module 207 evaluates the shelf in the representative planogram to determine whether the shelf is filled with items. The planogram aggregation module 207 determines whether space is available in a shelf of the representative planogram. The planogram aggregation module 207 determines whether there is room for more items to be placed on a shelf. If the planogram aggregation module 207 determines there is room for more items on the shelf, the planogram aggregation module 207 identifies the brand chunk on shelf that is shortest and adds the next item on the priority list for that brand chunk to the shelf. The planogram aggregation module 207 determines whether the next item on the priority list fits with the other placed items in the brand chunks, for example, in terms of satisfying the neighbor rules and facings rules. If the item does not fit, the planogram aggregation module 207 skips to the next item on the priority list and checks whether it is fit to place the item on the shelf. The planogram aggregation module 207 continues to add items from the priority list until the shelf is full. For example, the planogram aggregation module 207 places items to fill out the average number of slots identified for the brand chunk in the shelf.

In some embodiments, the planogram aggregation module 207 determines whether there are too many items on the shelf based on the average chunk size in shelf. For example, if all the brand chunks are included in the shelf and the total length of the brand chunks exceeds the length of the representative planogram, then there are too many items on the shelf. If there are too many items, the planogram aggregation module 207 identifies the brand chunk on the shelf that is longest and proceeds to remove items from the brand chunk. The planogram aggregation module 207 removes an item that is lowest on the priority list for that brand chunk. If removing the item with low priority from the shelf does not fit with other placed items on the shelf, the planogram aggregation module 207 skips to the next item that is lowest on the priority list. The planogram aggregation module 207 continues to remove items until the items fit within the length of the representative planogram.

In some embodiments, the planogram aggregation module 207 stores the representative planogram and the set of aggregated planograms in the data storage 243.

The user interface module 211 may include software and/orlogic for providing user interfaces to a user. In some embodiments, the user interface module 211 receives instructions from the planogram generation module 205 to generate a graphical user interface of the planogram on the display of the client device 115. In other embodiments, the user interface module 211 sends graphical user interface data to an application (e.g., a browser) in the client device 115 via the communication unit 241 causing the application to display the data as a graphical user interface.

Figure 4:
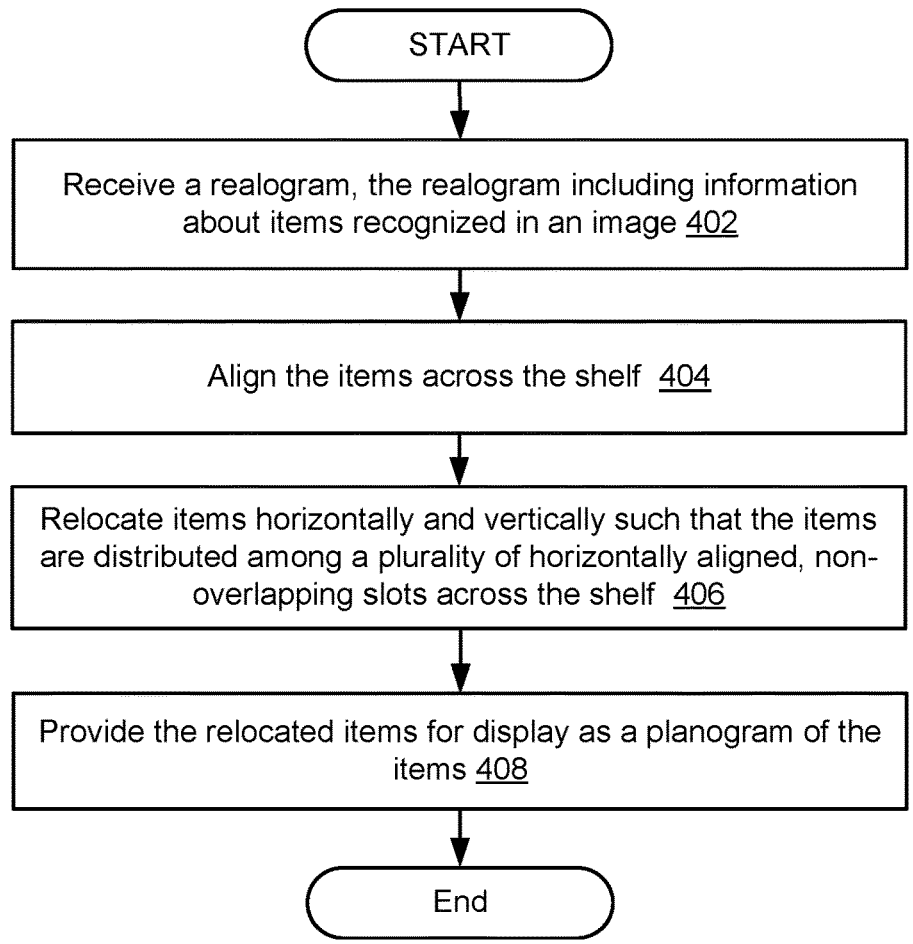
FIG. 4 is a flow diagram illustrating one embodiment of a method for generating a planogram from a realogram of a portion of a shelving unit.

FIG. 4 is a flow diagram illustrating one embodiment of a method 400 for generating a planogram from a realogram of a portion of a shelving unit. At 402, the image processing module 203 receives a realogram, the realogram including information about items recognized in an image (e.g., from a client device 115). In some embodiments, the planogram generation module 205 may receive information identifying products or items in an image (e.g., product identification and location information) and the step 402 may be omitted. At 404, the planogram generation module 205 aligns the items across the shelf. For example, the planogram generation module 205 may identify a plurality of facings (e.g., a stack of products on the shelf) using the image recognition results. The planogram generation module 205 may then identify one or more shelves (i.e., linear groups) corresponding to the plurality of facings. The planogram generation module 205 may determine a product recognition corresponding to the one or more items stacked in each of the plurality of facings and associate the facing with the product recognition. In some embodiments, the planogram generation module 205 may remove items in the facing leaving a single product representing the facing. The planogram generation module 205 may then align the products from the facings on a shelf (e.g., align the bottom edge, top edge, center of a product, etc.). At 406, the planogram generation module 205 relocates items horizontally and vertically such that the items are distributed among a plurality of horizontally aligned, non-overlapping slots across the shelf. At 410, the planogram generation module 205 provides the relocated items for display as a planogram of the items.

Figure 5A:
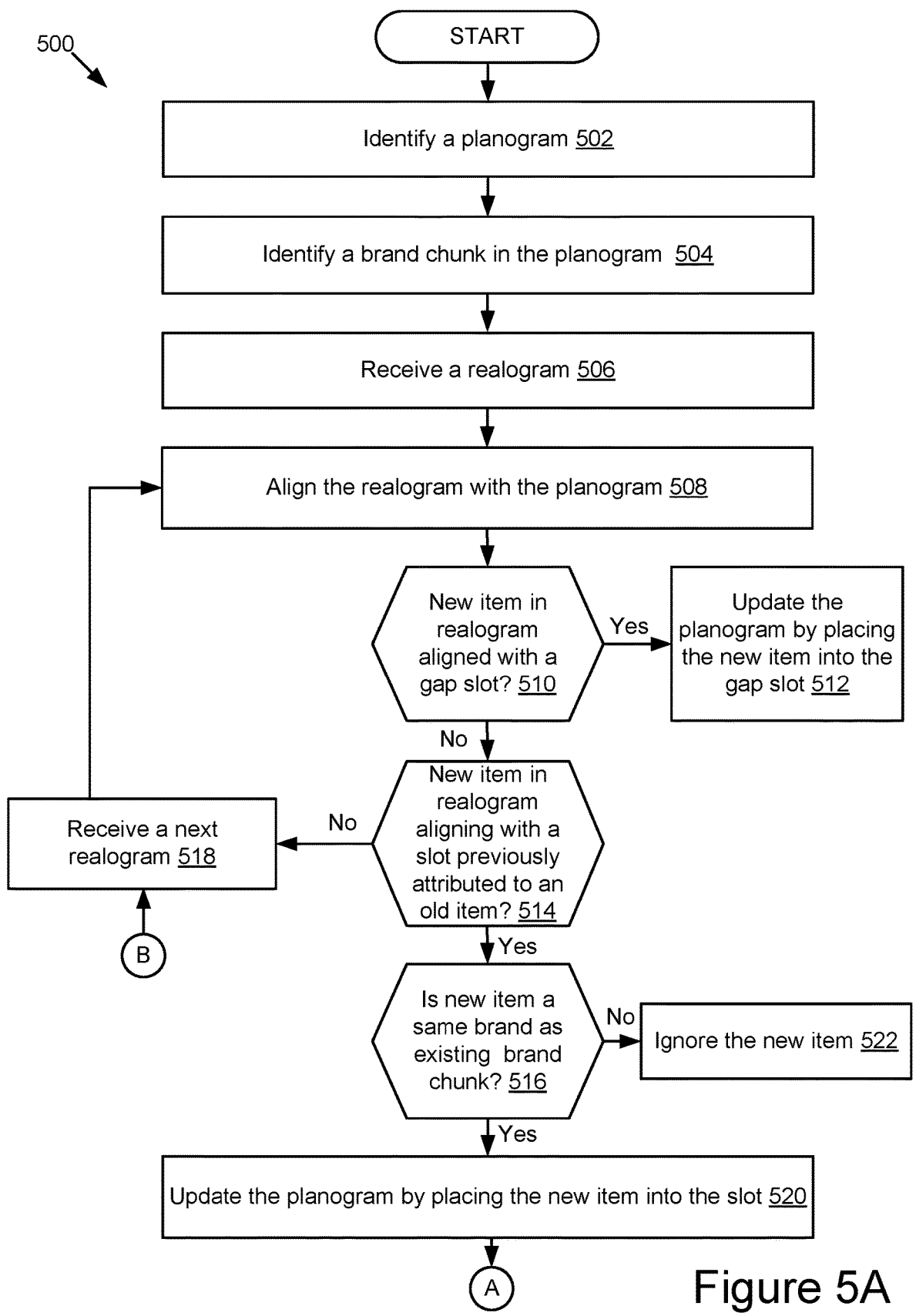
FIGS. 5A-5B are flow diagrams illustrating one embodiment of an example method for updating a planogram by harmonizing a plurality of realograms received over time.
Figure 5B:
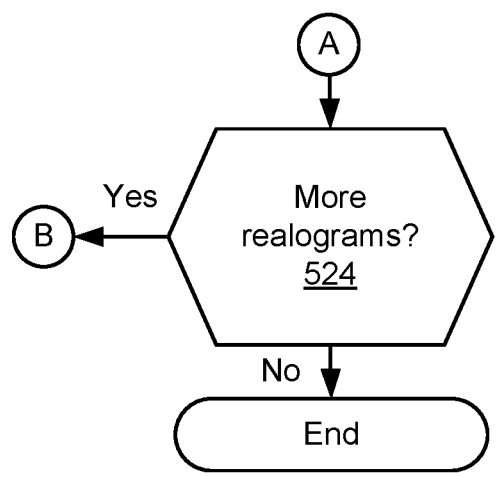

FIGS. 5A and 5B are flow diagrams illustrating one example embodiment of a method 500 for updating a planogram by harmonizing realograms received over time. At 502, the planogram generation module 205 identifies a planogram. For example, the planogram generation module 205 generates the planogram, as described above, from a first realogram in a time series. At 504, the planogram generation module 205 identifies a brand chunk in the planogram. At 506, the planogram generation module 205 receives a realogram (e.g., the next realogram in a series of realograms). At 508, the planogram generation module 205 aligns the realogram with the planogram. At 510, the planogram generation module 205 determines whether a new item in the realogram is aligned with a gap slot in the planogram. If the new item is aligned with the gap slot, at 512, the planogram generation module 205 updates the planogram by placing the new item into the gap slot of the planogram. If the new item is not aligned with the gap slot, at 514, the planogram generation module 205 determines whether the new item in the realogram is aligned with a slot previously attributed to an old item in the planogram. If the new item is aligned with the slot, at 516, the planogram generation module 205 determines whether the new item is a same brand as an existing brand chunk including the slot. If the new item is not aligned with the slot, at 518, the planogram generation module 205 ignores the new item, receives a next realogram, and the method 500 repeats the process at 508. If, at 516, the new item is the same brand as the existing brand chunk, at 520, the planogram generation module 205 updates the planogram by placing the new item into the slot of the planogram (e.g., fills the gap slot or replaces the old item). If, at 516, the new item is not the same brand as the existing brand chunk, at 522, the planogram generation module 205 ignores the new item. At 524, the planogram generation module 205 determines whether there are more realograms in the time series. If there are more realograms, the method 500 repeats the process at 518. If there are no more realograms, the method 500 ends.

Figure 6A:
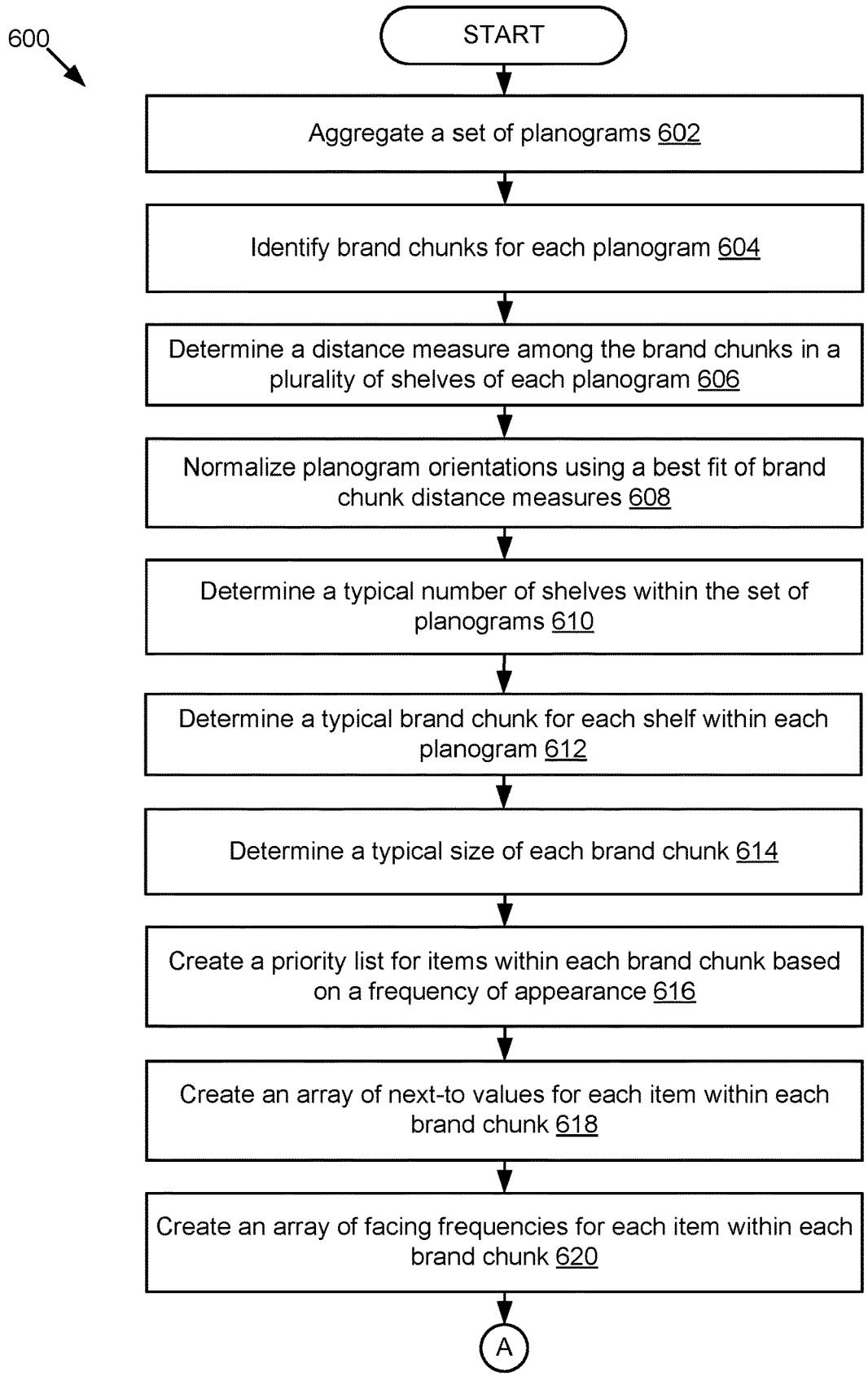
FIGS. 6A-6B are flow diagrams illustrating one embodiment of an example method for generating a representative planogram by aggregating a plurality of realograms.
Figure 6B:
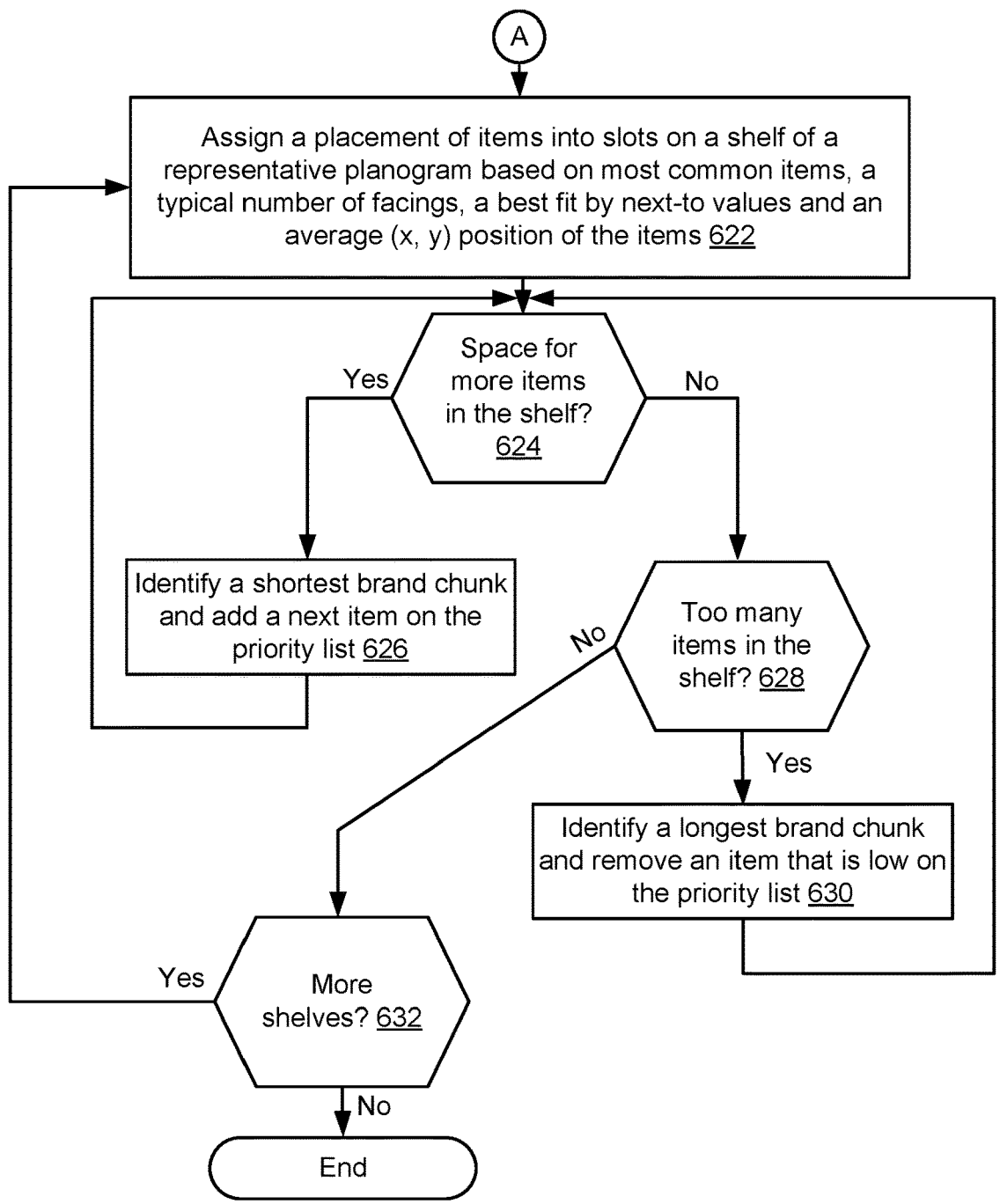

FIGS. 6A-6B are flow diagrams illustrating one embodiment of a method 600 for generating a representative planogram by aggregating a plurality of realograms. At 602, the planogram aggregation module 207 aggregates a set of planograms. At 604, the planogram aggregation module 207 identifies brand chunks for each planogram. At 606, the planogram aggregation module 207 determines a distance measure among the brand chunks in a plurality of shelves of each planogram. At 608, the planogram aggregation module 207 normalizes planogram orientations using a best fit of brand chunk distance measures. At 610, the planogram aggregation module 207 determines a typical number of shelves within the set of planograms. At 612, the planogram aggregation module 207 determines a typical brand chunk for each shelf within each planogram. At 614, the planogram aggregation module 207 determines a typical size of each brand chunk. At 616, the planogram aggregation module 207 creates a priority list for items within each brand chunk based on a frequency of appearance. At 618, the planogram aggregation module 207 creates an array of next-to values for each item within each brand chunk. At 620, the planogram aggregation module 207 creates an array of facing frequencies for each item within each brand chunk. At 622, the planogram aggregation module 207 assigns a placement of items into slots on a shelf of a representative planogram based on most common items, a typical number of facings, a best fit by next-to values, and an average (x, y) position of the items. At 624, the planogram aggregation module 207 determines whether there is space for more items in the shelf. If there is more space, at 626, the planogram aggregation module 207 identifies a shortest brand chunk and adds a next item on the priority list and the method 600 repeats the process at 624. If there is no more space, at 628, the planogram aggregation module 207 determines whether there are too many items on the shelf. If there are too many items on the shelf, at 630, the planogram aggregation module 207 identifies a longest brand chunk and removes an item that is low on the priority list and the method 600 repeats the process at 624. If there are not too many items on the shelf, at 632, the planogram aggregation module 207 determines whether there are more shelves in the representative planogram. If there are more shelves, the method 600 repeats the process at 622. If there are no more shelves, the method 600 ends.

A system and method for generating a planogram has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
    receiving, by one or more processors, a first realogram from an image processing module of a client device, the first realogram including information about items recognized in the first realogram;
    determining, by the one or more processors, a plurality of items associated with a shelf in the first realogram;
    relocating, by the one or more processors, the plurality of items associated with the shelf in a first direction in the first realogram using the information about items recognized in the first realogram such that the plurality of items are aligned relative to an edge of the shelf;
    relocating, by the one or more processors, the plurality of aligned items associated with the shelf apart from each other in a second direction, perpendicular to the first direction, in the first realogram, such that the plurality of aligned items occupy a plurality of non-overlapping slots;
    generating, by the one or more processors, a planogram using the plurality of relocated items;
    transmitting, by the one or more processors, the planogram for display on the client device;
    identifying brand chunks in a representative planogram, the representative planogram being based on the planogram and a plurality of other planograms generated in a similar manner;
    determining whether there are too many items on a shelf of the representative planogram; and
    responsive to determining that there are too many items, identifying a longest brand chunk on the shelf and removing an item from the representative planogram that is lowest priority on a priority list for the longest brand chunk on the shelf.

2. The method of claim 1, further comprising:
    receiving a second realogram, the second realogram including information about items recognized in the second realogram;
    aligning the second realogram with the planogram to perform a comparison;
    identifying a gap slot in the planogram of the items;
    determining whether there is a new item in the second realogram aligned with the gap slot; and
    responsive to determining the new item is aligned with the gap slot, updating the planogram by placing the new item in the gap slot.

3. The method of claim 2, wherein identifying the gap slot comprises:
    determining whether a width of a gap between a first item and a second item is greater than a width of one of a neighboring slot; and
    in response to determining that the width of the gap is greater than the width of the neighboring slot, determining a number of slots within the gap based on the width of the gap and the width of the neighboring slot.

4. The method of claim 2, further comprising generating a notification for a user to identify a missing item in the gap slot.

5. The method of claim 1, further comprising:
    receiving a second realogram, the second realogram including information about items recognized in the second realogram;
    aligning the second realogram with the planogram to perform a comparison;
    identifying a plurality of brand chunks in the planogram;
    determining whether a new item in the second realogram is aligned with a slot previously accounted for by an old item in the planogram;
    determining an existing brand chunk corresponding to the slot in the planogram and whether the new item is a same brand as the existing brand chunk; and
    responsive to determining that the new item is the same brand as the existing brand chunk, updating the planogram by replacing the old item with the new item in the slot.

6. The method of claim 1, further comprising:
aggregating a set of planograms including the planogram of the items and the plurality of other planograms generated in a similar manner;
identifying brand chunks for each planogram of the set of planograms;
determining a typical number of facings within the set of planograms;
creating an array of next-to values for each item within each brand chunk; and
assigning a placement of items into slots on the shelf of the representative planogram based on the typical number of facings and a best fit of next-to values for the items.

7. The method of claim 6, further comprising:
determining whether there is room on the shelf of the representative planogram for more items; and
responsive to determining that there is room, identifying a shortest brand chunk on the shelf and adding an item that is next on a priority list for the shortest brand chunk on the shelf.

8. A system comprising:
one or more processors; and
a memory, the memory storing instructions, which when executed cause the one or more processors to:
receive a first realogram from an image processing module of a client device, the first realogram including information about items recognized in the first realogram;
determine a plurality of items associated with a shelf in the first realogram;
relocate the plurality of items associated with the shelf in a first direction in the first realogram using the information about the items recognized in the first realogram such that the plurality of items are aligned relative to an edge of the shelf;
relocate the plurality of aligned items associated with the shelf apart from each other in a second direction, perpendicular to the first direction, in the first realogram such that the plurality of aligned items occupy a plurality of non-overlapping slots;
generate a planogram using the plurality of relocated items;
transmit the planogram for display on the client device;
identify brand chunks in a representative planogram, the representative planogram being based on the planogram and a plurality of other planograms generated in a similar manner;
determine whether there are too many items on a shelf of the representative planogram; and
responsive to determining that there are too many items, identifying a longest brand chunk on the shelf and removing an item from the representative planogram that is lowest priority on a priority list for the longest brand chunk on the shelf.

9. The system of claim 8, wherein the instructions further cause the one or more processors to:
receive a second realogram, the second realogram including information about items recognized in the second realogram;
align the second realogram with the planogram to perform a comparison;
identify a gap slot in the planogram of the items;
determine whether there is a new item in the second realogram aligned with the gap slot; and
responsive to determining the new item is aligned with the gap slot, update the planogram by placing the new item in the gap slot.

10. The system of claim 9, wherein to identify the gap slot, the instructions further cause the one or more processors to:
determine whether a width of a gap between a first item and a second item is greater than a width of one of a neighboring slot; and
in response to determining that the width of the gap is greater than the width of the neighboring slot, determine a number of slots within the gap based on the width of the gap and the width of the neighboring slot.

11. The system of claim 8, wherein the instructions further cause the one or more processors to:
receive a second realogram, the second realogram including information about items recognize in the second realogram;
align the second realogram with the planogram to perform a comparison;
identify a plurality of brand chunks in the planogram;
determine whether a new item in the second realogram is aligned with a slot previously accounted for by an old item in the planogram;
determine an existing brand chunk corresponding to the slot in the planogram and whether the new item is a same brand as the existing brand chunk; and
responsive to determining that the new item is the same brand as the existing brand chunk, update the planogram by replacing the old item with the new item in the slot.

12. The system of claim 11, wherein the instructions further cause the one or more processors to:
responsive to determining that the new item is not the same brand as the existing brand chunk, ignore the new item.

13. The system of claim 8, wherein the instructions further cause the one or more processors to:
aggregate a set of planograms including the planogram of the items and the plurality of other planograms generated in a similar manner;
identify brand chunks for each planogram of the set of planograms;
determine a typical number of facings within the set of planograms;
create an array of next-to values for each item within each brand chunk; and
assign a placement of items into slots on the shelf of the representative planogram based on the typical number of facings and a best fit of next-to values for the items.

14. A computer program product comprising a non-transitory computer readable medium storing a computer readable program, wherein the computer readable program when executed on a computer causes the computer to:
receive a first realogram from an image processing module of a client device, the first realogram including information about items recognized in the first realogram;
determine a plurality of items associated with a shelf in the first realogram;
relocate the plurality of items associated with the shelf in a first direction in the first realogram using the information about the items recognized in the first realogram such that the plurality of items are aligned relative to an edge of the shelf;
relocate the plurality of aligned items associated with the shelf apart from each other in a second direction, perpendicular to the first direction, in the first realogram such that the plurality of aligned items occupy a plurality of non-overlapping slots;
generate a planogram using the plurality of relocated items;
transmit the planogram for display on the client device;
identify brand chunks in a representative planogram, the representative planogram being based on the planogram and a plurality of other planograms generated in a similar manner;
determine whether there are too many items on a shelf of the representative planogram; and
responsive to determining that there are too many items, identifying a longest brand chunk on the shelf and removing an item from the representative planogram that is lowest priority on a priority list for the longest brand chunk on the shelf.

15. The computer program product of claim 14, wherein the computer readable program when executed on the computer further causes the computer to:
receive a second realogram, the second realogram including information about items recognized in the second realogram;
align the second realogram with the planogram to perform a comparison;
identify a gap slot in the planogram of the items;
determine whether there is a new item in the second realogram aligned with the gap slot; and
responsive to determining the new item is aligned with the gap slot, update the planogram by placing the new item in the gap slot.

16. The computer program product of claim 15 wherein to identify the gap slot the computer readable program when executed on the computer further causes the computer to:
determine whether a width of a gap between a first item and a second item is greater than a width of one of a neighboring slot; and
in response to determining that the width of the gap is greater than the width of the neighboring slot, determine a number of slots within the gap based on the width of the gap and the width of the neighboring slot.

17. The computer program product of claim 14, wherein the computer readable program when executed on the computer further causes the computer to:
receive a second realogram, the second realogram including information about items recognized in the second realogram;
align the second realogram with the planogram to perform a comparison;
identify a plurality of brand chunks in the planogram of the items;
determine whether a new item in the second realogram is aligned with a slot previously accounted for by an old item in the planogram;
determine an existing brand chunk corresponding to the slot in the planogram and whether the new item is a same brand as the existing brand chunk; and
responsive to determining that the new item is the same brand as the existing brand chunk, update the planogram by replacing the old item with the new item in the slot.

18. The computer program product of claim 17, wherein the computer readable program when executed on the computer further causes the computer to:
responsive to determining that the new item is not the same brand as the existing brand chunk, ignore the new item.

19. The computer program product of claim 14, wherein the computer readable program when executed on the computer further causes the computer to:
aggregate a set of planograms including the planogram of the items and the plurality of other planograms generated in a similar manner;
identify brand chunks for each planogram of the set of planograms;
determine a typical number of facings within the set of planograms;
create an array of next-to values for each item within each brand chunk; and
assign a placement of items into slots on the shelf of the representative planogram based on the typical number of facings and a best fit of next-to values for the items.

* * * * *